United States Patent [19]

Ichimura et al.

[11] Patent Number: 4,997,259
[45] Date of Patent: Mar. 5, 1991

[54] LIGHT SOURCE SYSTEM WITH UNIFORMING DEVICE FOR OPTICAL FIBER TYPE LIGHTGUIDE

[75] Inventors: Kiyoshi Ichimura; Masaki Fuse; Yukio Shibuya, all of Tokyo, Japan

[73] Assignee: Mitsubishi Rayon Co., Ltd., Japan

[21] Appl. No.: 340,310

[22] Filed: Apr. 19, 1989

[30] Foreign Application Priority Data

Apr. 28, 1988 [JP] Japan ............... 63-106779

[51] Int. Cl.⁵ ................ G02B 5/14; G01B 11/14
[52] U.S. Cl. ............... 350/96.24; 250/227.11
[58] Field of Search ............ 350/96.24, 96.25; 250/227; 362/32, 259

[56] References Cited

U.S. PATENT DOCUMENTS

| | | | |
|---|---|---|---|
| 3,926,501 | 12/1975 | Hama | 350/96.10 |
| 4,212,516 | 7/1980 | Sawamura | 350/96.24 |
| 4,515,479 | 5/1985 | Pryor | 250/560 |

FOREIGN PATENT DOCUMENTS

| | | |
|---|---|---|
| 60-242408 | 2/1985 | Japan . |
| 60-202410 | 12/1985 | Japan . |
| 61-251858 | 11/1986 | Japan . |
| 62-017705 | 1/1987 | Japan . |
| 62-195106 | 12/1987 | Japan . |
| 62-284313 | 12/1987 | Japan . |
| 2117131 | 10/1983 | United Kingdom . |

Primary Examiner—Akm Ullah
Attorney, Agent, or Firm—Lowe, Price, LeBlanc, Becker & Shur

[57] ABSTRACT

An optical system having a light source, a uniforming device and an optical fiber type lightguide, wherein the uniforming device comprises a first optical transmission portion connected to the lightguide and a second optical transmission portion connected to the first optical transmission portion including a plurality of optical fibers stretching across the inside thereof which are arranged in such a manner that a light-receiving end of each of the optical fibers is placed at a randomly assigned position on a light-receiving end of the second optical transmission portion and on the other hand a light-emitting end of each of the optical fibers is placed at a randomly assigned position on a light-emitting end of the second optical transmission portion, thereby uniforming the distribution of the quantity of light emitted therefrom.

6 Claims, 8 Drawing Sheets

LIGHT SOURCE SYSTEM WITH UNIFORMING DEVICE FOR OPTICAL FIBER TYPE LIGHTGUIDE

BACKGROUND OF THE INVENTION

1. Field of the Invention

This invention relates generally to an optical system for transmitting light emitted from a light source to an optical fiber type waveguide or lightguide and more particularly to-improvement of a light source system including a light source and a uniforming device connected to a light-receiving end of the optical fiber type lightguide at an end thereof for receiving light emitted from the light source and emitting light, of which quantity or amount is uniformly distributed in every direction of emission, to the light-receiving end of the lightguide.

2. Description of the Prior Art

A typical optical fiber type lightguide, for example, what is called a "linear pattern outputting lightguide" or a "circular pattern outputting lightguide" (that is, a lightguide having a linear or circular light-emitting end) includes a large number of optical fibers and is adapted to receive and transmit the light received from a light source and output the light from the light-emitting end thereof to an external point.

Figure 16:
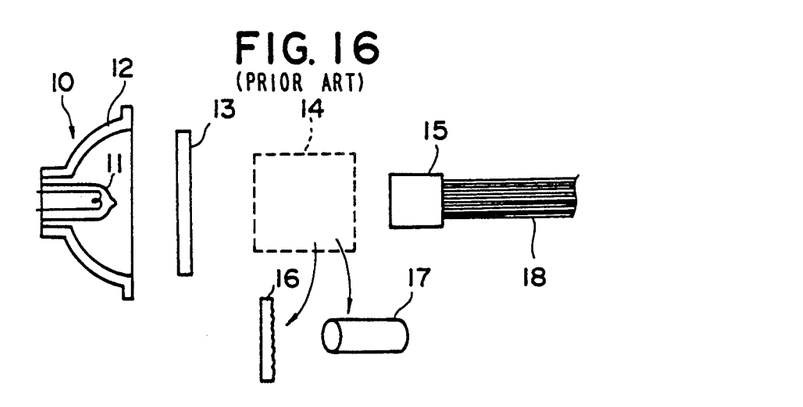
FIG. 16 is a diagram showing the light source system of a conventional optical fiber type lightguide.

FIG. 16 is a diagrammatical sectional view of a conventional optical system having such a typical lightguide, wherein light radiated from a lamp 11, which can be regarded as a point source of light, is condensed or converged by a reflecting mirror 12. Further, infrared radiation harmful to optical fibers 18 included in a lightguide 15 is removed therefrom by a heat absorbing glass or an infrared absorbing filter 13. Thereafter, the light is directly incident on an end of the lightguide 15.

Nowadays, the lightguides are widely used for general illumination or lighting. Further, in recent years, the lightguides have become employed as light sources of, for instance, inline inspection systems in automated factories, optical business machines and so on. With such spread of the lightguides, it has become requested that the distribution of the quantity of light emitted therefrom is as uniform as possible in every direction of emission of light. Thus, there have been proposed various optical systems provided with a uniforming means 14 such as a diffusing plate 16, a cylindrical or columnar body 17 made of light-transmitting material (hereunder referred to as a cylindrical or columnar light-transmitting device) or the like in a light source system thereof prior to the optical fibers of the lightguide 15 for uniforming, that is, making the distribution in angle of emitting (hereunder referred to as "emitting angle") of the quantity of light which is incident on a light-receiving end of the lightguide.

Such a conventional light source system including a uniforming means for uniforming the quantity of the light, which is incident on the light-receiving end (hereunder referred to as the "incident end") of the lightguide, has a drawback wherein effects of illumination by the light source are extremely degraded because the quantity of the incident light itself decreases due to the diffusion of the light caused by the diffusion plate, though the uniformity of the distribution in "emitting angle" of the quantity of the incident light in every incident angle of light on the "incident end" of the lightguide as well as that of the distribution in "emitting angle" of the quantity of light emitted from the light-guide is promoted or enhanced with increase of the diffusion coefficient of the diffusion plate. Incidentally, the term "incident end" is further used hereinbelow to indicate a light-receiving end of a device such as a lightguide.

Further, the conventional light source system employing the columnar or cylindrical light-transmitting device has a defect that it has little effect on the enhancement of the uniformity of the distribution of the quantity of the incident light, though the efficiency of illumination is not decreased. The present invention overcomes these defects of the prior art optical system.

It is accordingly an object of the present invention to provide a light source system having an improved light receiving device including a uniforming means which can uniform the distribution of the quantity of the light emitted therefrom to the lightguide in every direction of the emission of the light without decreasing the quantity of the emitted light during the transmission of the light therethrough.

SUMMARY OF THE INVENTION

To achieve the foregoing object and in accordance with a first embodiment of the present invention, there is provided a light receiving device connected to an optical fiber type lightguide and comprising a first optical transmission means such as a columnar or cylindrical light-emitting device connected to the lightguide as a first uniforming means and a second optical transmission means connected to the first optical transmission means as a second uniforming means. Further, a plurality of optical fibers are provided in the second optical transmission means such that an "incident end" of each optical fiber is randomly positioned on the surface of the "incident end" of the second optical transmission means and on the other hand a light-emitting end (hereunder referred to as an "emitting end") of each optical fiber is also randomly positioned on the surface of the "emitting end" of the second optical transmission means. That is, an "incident end" of each optical fiber is positioned at a randomly assigned position on the surface of the "incident end" of the second optical transmission means and on the other hand an "emitting end" of each optical fiber is also placed at a randomly assigned position on the surface of the "emitting end" of the second optical transmission means. Thereby, the substantially equal quantity of light can be emitted from the uniforming means in every direction of emission of light and be incident on the "incident end" of the lightguide. Thus, the uniform quantity of light can be emitted from the uniforming means and further from the lightguide in every direction of emission of light. Incidentally, the term "emitting end" is further used herein to indicate an light-emitting end of a device.

Further, in accordance with a second aspect of the present invention, there is provided a light source system having a light source for emitting light and a uniforming device which includes a large number of optical fibers, a first optical transmission means such as a cylindrical or columnar light-emitting device connected to an "incident end" of the lightguide at an "emitting end" thereof and further a second optical transmission means having an "emitting end" connected to an "incident end" of the first optical transmission means and another end (that is, an "incident end") released for receiving the light from the light source and a large number of optical fibers extending between both of the ends thereof arranged such that an "incident end" of each optical fiber is randomly positioned on the "incident end" thereof and on the other hand an "emitting end" of each optical fiber is randomly positioned on an "emitting end" thereof.

As above described, the "incident end" of the second optical transmission means is an open end and arranged in the uniforming device in such a manner to receive the light irradiated by the source of light in various directions. When the light emitted from the source of light is incident on this open end, that is, on the "incident end" of the second optical transmission means, the incident light is transmitted to the "emitting end" thereof by the plurality of optical fibers. An "incident end" of each of the plurality of optical fibers, which are included within the second optical transmission portion, is randomly positioned on the "incident end" of the second optical transmission means and on the other hand an "emitting end" of each optical fiber is also randomly placed on the "emitting end" of the second optical transmission means. Thereby, the intensity of the light on the "incident end" of the second optical transmission means is uniformed (that is, the variation in intensity of the light on the "incident end" thereof is decreased or controlled) so that the chiaroscuro, that is, the intensity of the light is uniformly distributed over the "emitting end" thereof. Thus, the light, of which the quantity is uniformly distributed over the "emitting end" of the first optical transmission means, is given to the lightguide. Thereby, the light, of which the distribution of the intensity is substantially uniform over the section of the lightguide, is incident on the "incident end" of the lightguide and as a consequence, the light, of which the distribution of the intensity is substantially uniform over the section thereof, is obtained on the "emitting end" of the lightguide.

Moreover, a light source system using the uniforming device for optical fiber type lightguide according to the present invention can transmit the light received from the light source to the lightguide with high efficiency. Thereby, the uniform distribution of the relatively large quantity or intensity of light can be obtained on the "emitting end" of the lightguide.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which.

DETAILED DESCRIPTION OF PREFERRED EMBODIMENTS

Hereinafter, preferred embodiments of the present invention will be described in detail with reference to the accompanying drawings.

Figure 1:
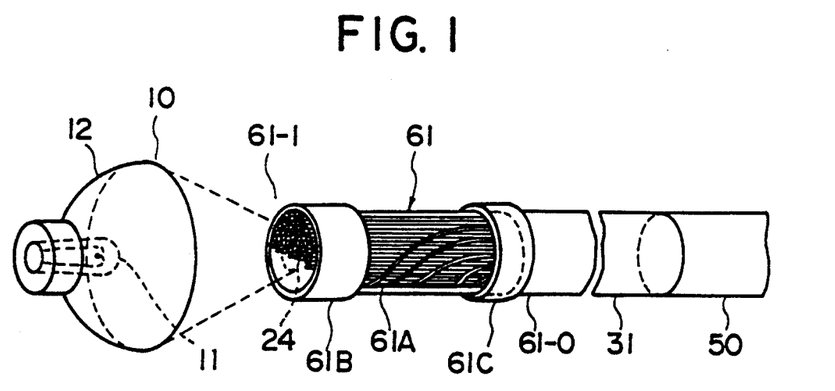
FIG. 1 is a diagram showing a light receiving device for use in an optical fiber type lightguide according to the present invention.

First, FIG. 1 is a perspective view of an optical system which employs a uniforming device of the present invention connected to an optical fiber type lightguide. A device including a 100 watt halogen lamp 11 provided within a reflecting mirror 12, the inside of which is provided with a dichroic reflecting surface, is used as a source 10 of light. The reflecting mirror 12 and the halogen lamp 11 are arranged such that the light is condensed or converged at a position 24 (hereunder referred to as a "focal position") shown as a circle drawn by a dotted line in this figure. This "focal position" is 40 mm forwardly apart from a front end 12A of the reflecting mirror 12 along an optical axis thereof.

The uniforming device of the present invention is composed of a first and second optical transmission portions 31 and 61 connected to each other and is arranged such that the "incident end" 61-I of the second optical transmission portion 61 is positioned at the "focal position" 24. In this embodiment, the first optical transmission portion 31 is a columnar or cylindrical light-transmitting device made of acrylic resin and having a diameter of 15 mm and a length of 150 mm. Further, the second optical transmission portion 61 is constructed by fixing both ends of a bundle composed of six hundred plastic optical fibers 61A each having a diameter of 0.5 mm (millimeters) and a length of 1 m (meter) by metal mouth pieces 61B and 61C. A method of fabricating the second optical transmission portion 61 will be further described in detail hereinbelow.

First, the bundle composed of the optical fibers 61A is inserted into the mouth piece 61B such that a small portion of an end of the bundle protrudes from the mouth piece 61B. Further, the other end of the bundle composed of the optical fibers 61A is inserted into the mouth piece 61C in such a manner to protrude from the mouth piece 61C. Moreover, an "emitting end" of each of the optical fibers 61A is randomly placed on an outer end surface of the mouth piece 61C and on the other hand an "incident end" of each of the optical fibers 61A is randomly placed on an outer end surface of the mouth piece 61B. This bundle of the optical fibers 61A is fixed at both ends thereof by the mouth pieces 61B and 61C. The mouth pieces 61B and 61C each gripping end of the optical fibers 61A are put into an electric furnace to be given a heat treatment therein. After being treated by the heat of 130° C. for about 10 minutes, both end portions of each of the optical fibers 61A transforms expanding in the radial direction thereof. Thus, the shape of the section of each optical fiber 61A within the mouth pieces 61B and 61C is changed from a circle into a hexagon. Thereby, the density of the optical fibers 61A in the section of the mouth piece 61B or 61C is extremely increased and the optical fibers 61A becomes hard to come off the mouth pieces 61B and 61C. Thereafter, parts of the optical fibers 61A protruding from the mouth pieces 61B and 61C are cut off and further the surfaces of the sections of the optical fibers 61A are abraded and additionally polished to make the surfaces of the ends 61-I and 61-O flat. Thus, the second optical transmission portion 61 is by and large completed. It is, however, preferable that after the above described heat treatment, each of the optical fibers 61A is tentatively pulled out of the mouth pieces 61B and 61C and that epoxy resin is further applied to portions near to the ends of the optical fibers 61A and thereafter the optical fibers 61A are inserted into the mouth pieces 61B and 61C and fixed thereto.

As shown in FIG. 1, the second optical transmission portion 61 elongates straight. Further, the second optical transmission portion 61 is made by bundling up a large number of optical fibers and thus is flexible so that the portion 61 can be easily bended. The thus fabricated second optical transmission portion 61 is a flexible bundle of optical fibers as described above and is a little less than 1 m in length and 15 mm in diameter. This second optical transmission portion 61 is different from ordinary bundles of optical fibers in that an "incident end" of each of the optical fibers 61A is placed at a randomly assigned position on the "incident end" of the second optical transmission position 61 and furthermore an "emitting end" of each of the optical fibers 61A is placed at a randomly assigned position on the "emitting end" of the second optical transmission position 61.

The "emitting end" 61-O of the second optical transmission portion 61 is closely connected to an "emitting end" of the first optical transmission portion 31. Further, a cylindrical holder (not shown) is used to closely connect both of the portions 31 and 61 with each other. Moreover, this cylindrical holder is used to put an outer surface of the mouth piece 61C in touch with an outer surface near to an end of the first optical transmission portion 31. In addition, the cylindrical holder is provided with differences in level of the inner surface thereof in such a manner that the holder fits into both of the outer surface of the mouth piece 61C and that of the first optical transmission portion 31. Furthermore, the first optical transmission portion 31 is closely connected to the "incident end" of the lightguide 50 at the other end thereof. To this end, another holder (not shown) is similarly used. In case where the outer diameter of the first optical transmission portion 31 and that of the lightguide 50 are equal to each other and are 15 mm in case of this embodiment, holders each having no difference in level of the inner surface thereof are used. If a lightguide whose diameter is less than that of the first optical transmission portion 31 is used, a holder having difference in level corresponding to the difference in diameter between the first optical transmission portion and the lightguide is used.

Next, it will be described hereinbelow as to the capability of the light receiving device of the present invention of uniforming the intensity of the incident light.

Figure 2:
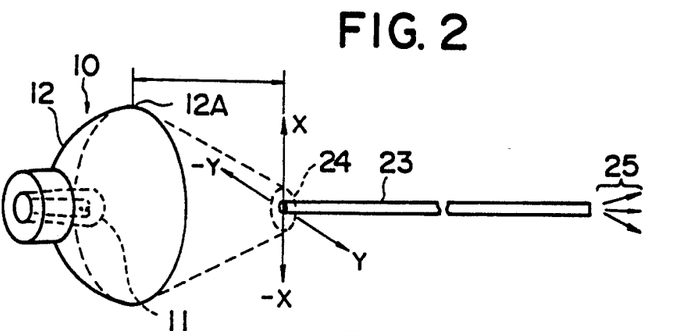
FIGS. 2, 4 and 6 are diagrams showing different arrangements of devices for measuring the intensity of the light emitted from a test optical fiber uniformed by the light receiving device of the present invention to compare the distribution in "emitting angle" of the quality of the emitted light with that in case of using the prior art light source system.
Figure 3:
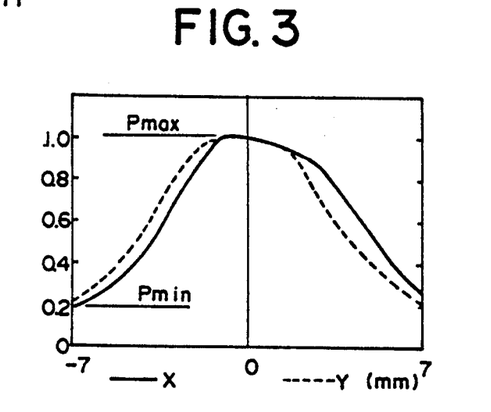
FIGS. 3, 5 and 7 are graphs showing the results of the measurements by effected by the systems of FIGS. 2, 4 and 6.
Figure 4:
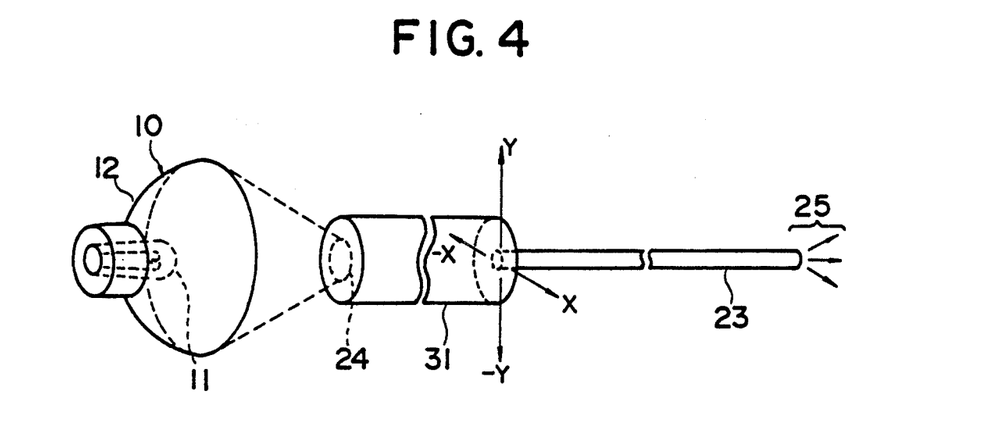
Figure 5:
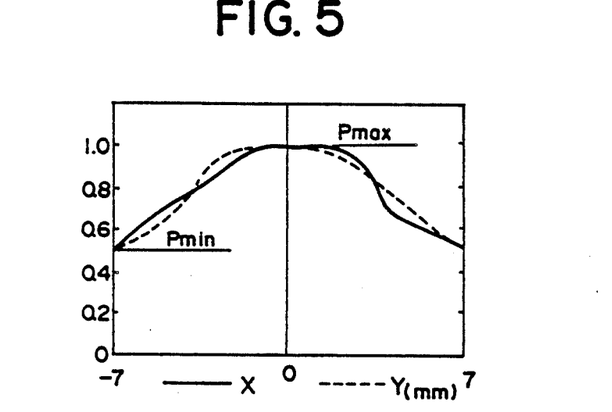
Figure 6:
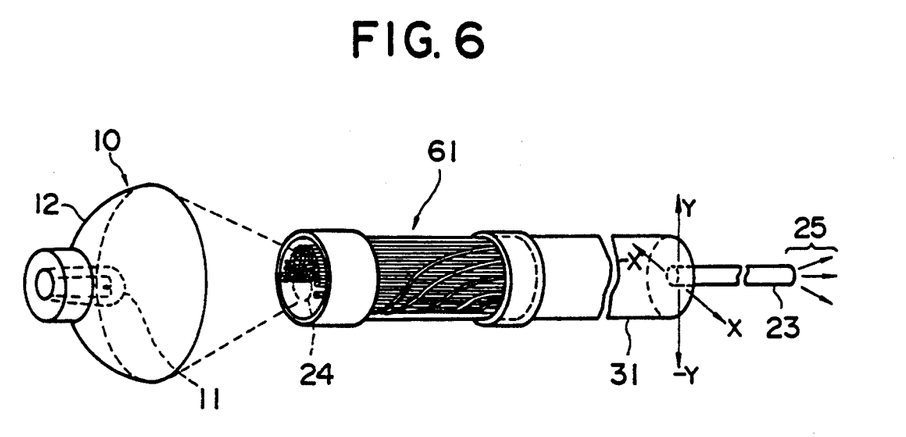

FIGS. 2, 4 and 6 are diagrams for showing the configurations of the devices for measuring the extent of uniforming the distribution of the intensity in cases of using no uniforming means, of using only the conventional cylindrical uniforming means and of using the uniforming device of the present invention, respectively. Further, devices equivalent to the light source 10 of FIG. 1 are used as light sources 10 shown in these figures. An end of a plastic optical fiber 23 for use in measurement (hereunder referred to simply as a test fiber), which has a diameter of 0.5 mm and a length of 1 m, is positioned at the center of the focal position of the source 10 of light. Further, an quantity of light issued from the test fiber 23 in this case is set as a unit quantity (that is, 1). Then, distributions in "emitting angle" of the quantity of the issued light are determined in cases that the test fiber 23 is moved in the X- and Y-directions which are perpendicular to both of the optical axis of the source 10 of light and the central axis of the test fiber 23. Moreover, the position of the test fiber 23 first varies from −7 mm to 7 mm in X-direction and then varies from −7 mm to 7 mm in Y-direction. FIG. 3 shows the result of the determination or measurement. Further, in FIG. 3 (and FIGS. 5 and 7), a solid curved line indicates the result of the measurement when the test fiber 23 is moved in X-direction and a dotted and curved line indicates the result of the measurement when the test fiber 23 is moved in the direction of Y-direction. On the other hand, as shown in FIG. 4, an end of the acrylic cylindrical light-transmitting device 31 having the same diameter and the same length as those of the first optical transmission portion 31 of FIG. 1, that is, a diameter of 15 mm and a length of 150 mm is placed at the focal position 24 of the light source system as a uniforming means. Furthermore, the test fiber 23 is made close to the other end of the light-transmitting device 31. Thus, the distribution of the quantity of the emitted light is determined in the manner similar to that described above. FIG. 5 shows the result of this measurement.

Figure 7:
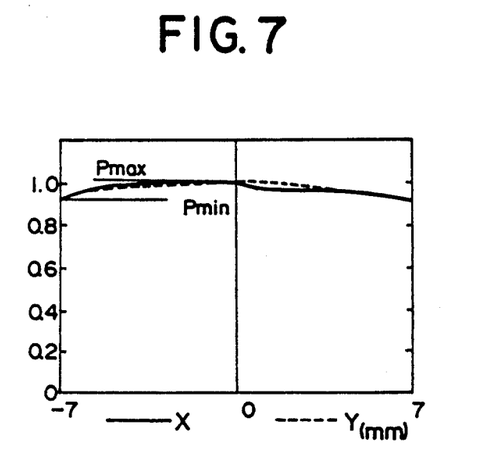

Furthermore, the "incident end" of the second optical transmission portion 61 of the uniforming device of the present invention is arranged as shown in FIG. 6 and further the test fiber 23 is made close to the "emitting end" of the first optical transmission portion 31. Further, the distribution of the quantity of the light issued from the light receiving device is determined. FIG. 7 shows the result of this measurement.

As is apparent from comparisons among FIGS. 3, 5 and 7, a substantially uniform distribution of the intensity of the emitted light over the whole "emitting end" of the light receiving device of the present invention can be obtained. Further, the intensity of the light is quantized and the variation in quantity of the emitted light is quantitatively determined as follows. That is, let the maximum and minimum values of the quantity of the light emitted from the test fiber 23 be Pmax and Pmin, respectively. Further, the variation in the quantity of the light issued from the test fiber 23 is defined by $$((P_{max} - P_{min})/(P_{max} + P_{min})) \times 100.$$

Thus, variations in quantity of the light issued from the test fiber 23 in the optical systems of FIGS. 2, 4 and 6 are listed as below.

TABLE 1

| uniforming means | variation in quantity of emitted light (%) |
| --- | --- |
| not provided (FIG. 2) | 69 |
| cylindrical light transmitting device (FIG. 4) | 34 |
| uniforming device of the present invention (FIG. 6) | 5 |

Figure 11:
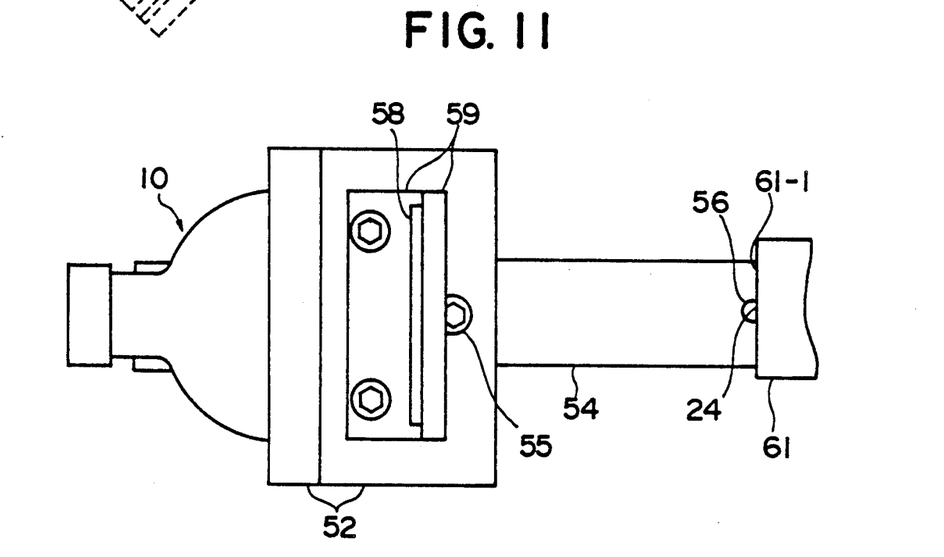
FIG. 11 is a diagram showing the configuration of devices for rotating the light source of FIG. 10 around a predetermined point.

As is seen from TABLE 1, in case of the optical system of the present invention as shown in FIGS. 6 and 11, the variation in quantity of the emitted light is about a fourteenth the variation in case of the optical system having no uniforming device as shown in FIG. 2 and is about a seventh the variation in case of the optical system having only the cylindrical light-transmitting device as shown in FIG. 4. Thus, in comparison with the conventional optical system, the distribution of the quantity of the emitted light is significantly uniformed in the system of the present invention.

Figure 8:
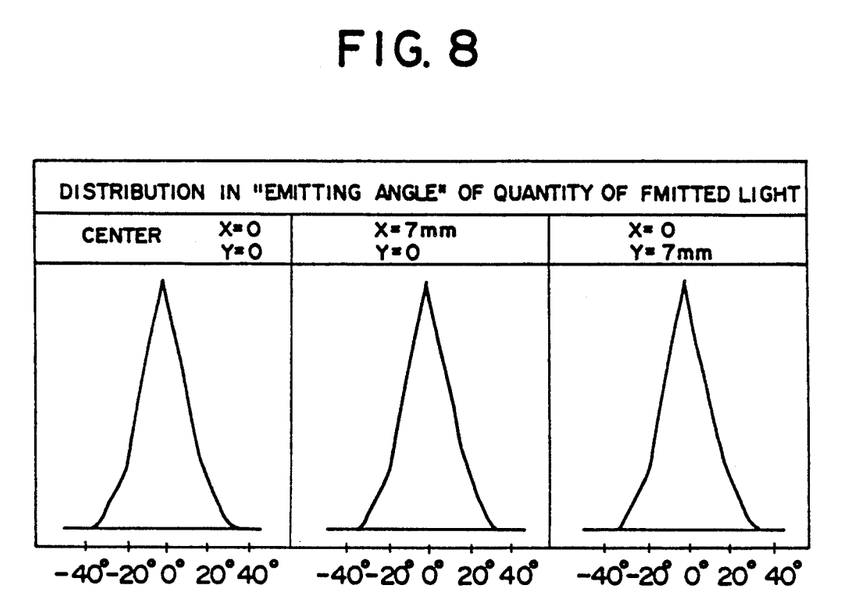
FIG. 8 shows graphs indicating the variation in the relative quantity of the light, which is incident on the test optical fiber, versus "emitting angles" (that is, angles each formed by a ray of the emitted light and a normal to the "emitting end") thereof in cases of using the light source systems of FIGS. 1 and 6.

FIG. 8 shows results of measurement of the quantity of the light 25 emitted from the test fiber 23 of FIG. 6 versus "emitting angles" in cases that the center of the "incident end" of the fiber 23 are placed at the positions represented by (X=0 Y=0), (X=+7 mm Y=0) and (Y=+7 mm X=0). As is seen from FIG. 8, the angular distribution of the quantity of the issued light is substantially invariant if the center of the "incident end" of the first optical transmission portion 31 is changed. Thus, the diameters of the first and second optical transmission portions 31 and 61 composing the uniforming means of the embodiment of FIG. 1 may be equal to or larger than that of the "incident end" of the lightguide 50 such as the "linear or circular pattern outputting lightguide". Further, the uniformity of the angular distribution of the quantity of the issued light is maintained regardless of the diameters of the optical transmission portions.

Figure 9:
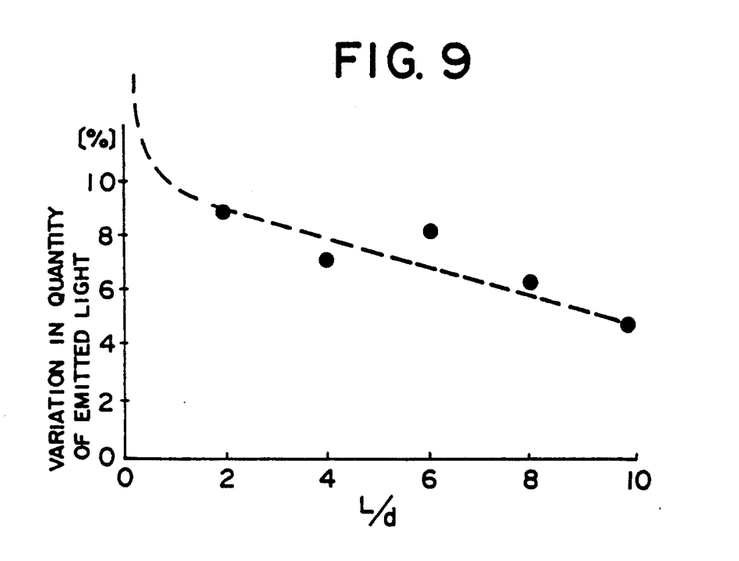
FIG. 9 is a graph showing the relation between a ratio of the length to the diameter of a first optical transmission portion and the variation in quantity of the issued light in cases of using the light source systems of FIGS. 1 and 6.

FIG. 9 is a graph showing change in quantity of the emitted light when the diameter d and the length L of the first optical transmission portion 31, that is, the cylindrical light-transmitting device of FIG. 1 change. As is seen from this graph, if a ratio (L/d) is larger than 2, the variation in the quantity of the issued light is less than or equal to about 9%. Thus, the device of the present invention can be put to practical use. On the other hand, if the ratio (L/d) is exceedingly small, the variation in quantity of the emitted light is drastically increased and becomes about 100% in case that the first optical transmission portion 31 is not used and only the second optical transmission portion 61 is used. This means that light and shade portions of the "emitting end" of the second optical transmission portion 61 can be still distinguished from each other and practically, the second optical transmission portion 61 alone is not enough to obtain the uniform distribution of the quantity of light to be emitted to the lightguide. However, the combination of the first and second optical transmission portions 31 and 61 can fully act as the uniforming means.

Figure 10:
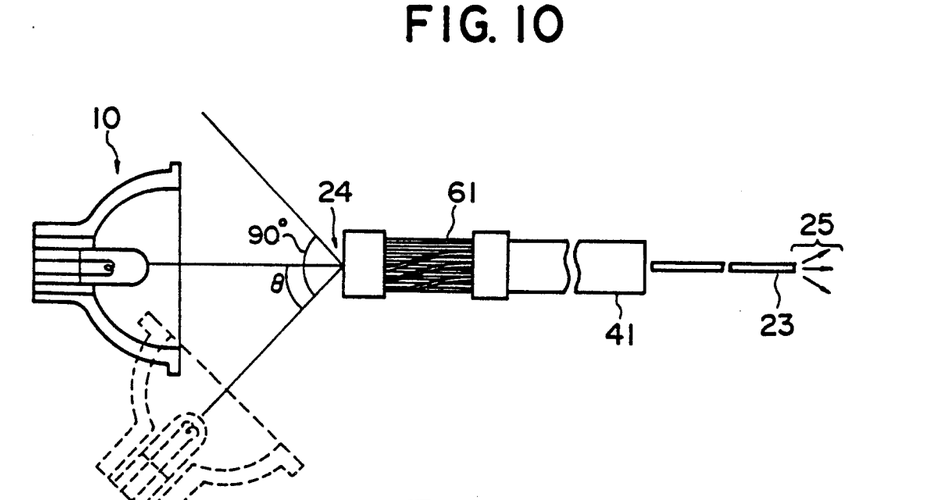
FIG. 10 is a diagram showing a light source system embodying the present invention.

FIG. 10 is a diagram showing a light source system including the light receiving device of the present invention. This light source system has a light receiving device as the uniforming means similar to that of FIG. 1, that is, a first and second optical transmission portions 31 and 61. This embodiment differs in construction from another embodiment of FIG. 1 in that the light source 10 is provided in the system in such a manner to rotate around a "focal position" 24. Consequently, the light source 10 can rotate around the "focal position" 24 on the "incident end" of the second light transmission portion 61 within the range of angle $\theta$ which is set to be 90° (degrees) in case of this embodiment, around the "focal position" 24 and can be fixed at any angular position within this range of angle. Incidentally, the angle $\theta$ is defined as an angle formed by an optical axis of the light source 10 and a central axis of the second optical transmission portion 61.

Further, FIG. 11 shows a configuration for rotatably providing the light source 10 in the optical system. The light source 10 is fixed to a L-shaped metal fitting 52 which is slidably mounted on a rail 54 and is fixed by a bolt 55 at a certain position such that the "focal position" 24 on the "incident end" 61-I of the second optical transmission portion 61. Further, this rail 54 is rotatably mounted on a chassis (not shown) by a bolt 56 which is positioned directly below the the "incident end" 61-I of the second optical transmission portion 61. Thus, if the rail 54 rotates around the chassis, the light source 10 rotates around the "focal position" 24. Further, in FIG. 11, reference numeral 58 indicates a heat absorbing glass fixed to the L-shaped metal fitting 52 by another L-shaped metal fitting 59. Thus, the light emitted by the light source 10 is first incident on and transmitted through the heat absorbing glass 58 before incident on the "incident end" 61-I of the second optical transmission portion 61 irrespective of whether any optical waveguide from the light source 10 thereto is provided. Further, the heat absorbing glass or infrared absorbing filter may be also provided in other embodiments as occasion demands.

Figure 12:
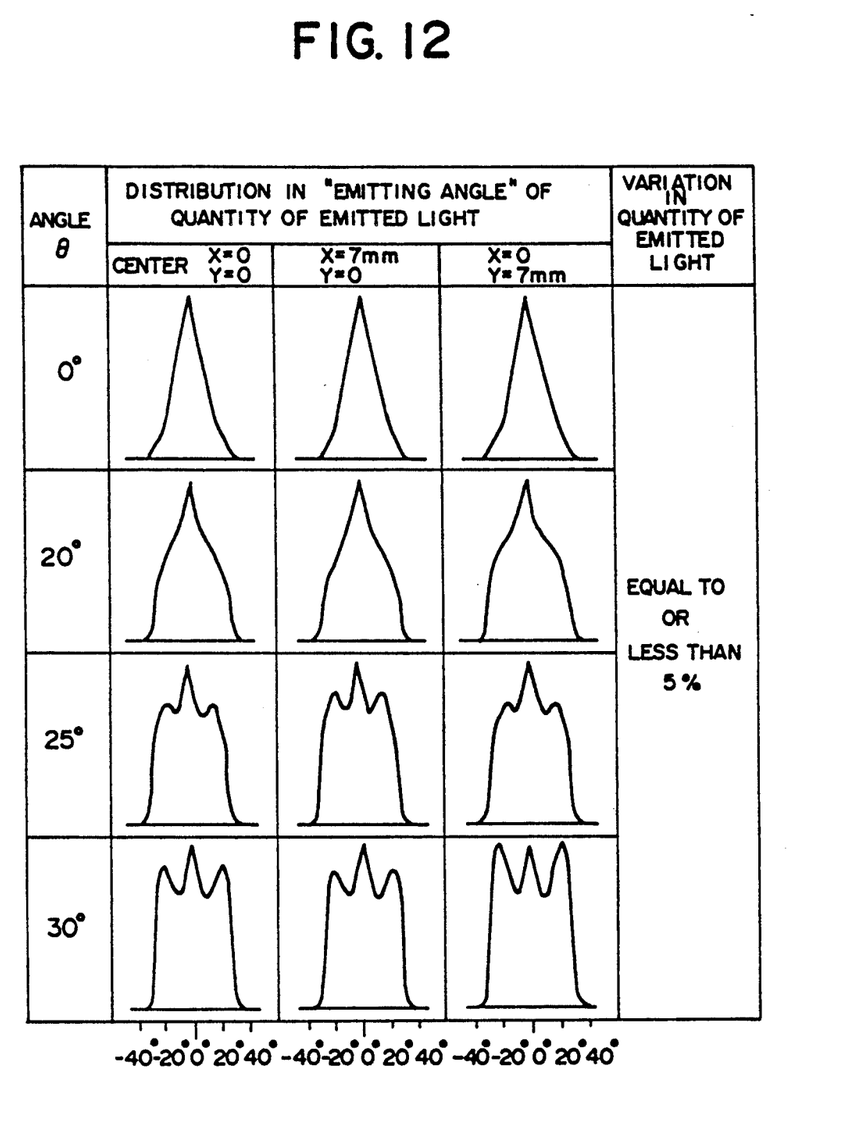
FIG. 12 is a graph showing the relation between the relative quantity of the light emitted from the uniforming means and "emitting angles" thereof and further indicating the variation in quantity of the light emitted from the uniforming means in case that the light source rotates around a predetermined position in the embodiment of FIG. 10.

FIG. 12 is a diagram showing the variation in quantity of the light issued from the uniforming means, that is, the second optical transmission portion 61 to the test fiber 23 in cases that the angles $\theta$ between the optical axis of the light source 10 and an axis perpendicular to the "incident end" 61-I are 0, 20, 25 and 30 degrees, as well as the distribution in "emitting angle" of the quantity of the light emitted from the second optical transmission portion 61 at each of the positions represented by (X=0 Y=0), (X=+7 mm Y=0) and (Y=+7 mm X=0) in each case that the angle $\theta$ is 0, 20, 25 or 30 degrees. As is seen from this figure, in case of the light source system of the present invention, the distribution of the quantity of the issued light can be changed by varying the angle $\theta$ between the optical axis of the light source and the axis normal to the "incident end" 61-I of the second optical transmission portion 61 with maintaining the uniform distribution of the quantity of the emitted light. Namely, by adjusting an angle $\theta$ between the optical axes of the light source and the light receiving device, the distribution of the quantity of the emitted light can be freely changed.

In this embodiment, the range of the angle $\theta$ is set to be 90° as above stated. It is, however, preferable that this range of the angle is limited to a range from $-\sin^{-1}(NAmin)-10°$ to $\sin^{-1}(NAmin)+10°$ where NAmin is the minimum value of the numerical apertures NA of the first and second optical transmission portions 31 and 61 and of the lightguides 50 such as a "linear or circular pattern outputting lightguide".

Figure 13:
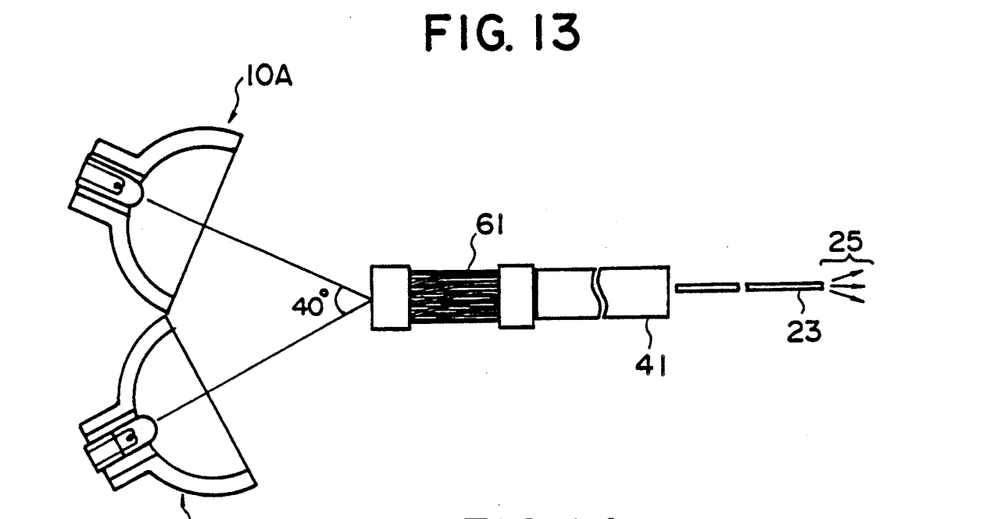
FIG. 13 is a diagram showing another light source system embodying the present invention.

FIG. 13 is a diagram showing another embodiment of the light source system according to the present invention. This embodiment has an uniforming means similar to that of the embodiment of FIG. 1 and further two light sources similar to that of the embodiment of FIG. 1. These sources 10A and 10B are arranged such that the angle formed by segments drawn from the center of the "focal position" 24 on the "incident end" 61-I to these sources is 40 degrees. In case of this embodiment, the quantity of the light emitted from the test fiber 23 is approximately 1.5 times that of the emitted light in case of the embodiment of FIG. 1. Thus, when the embodiment of FIG. 13 requires the same quantity of the emitted light as that of FIG. 1, the halogen lamp 11 of the light source 10 can be used with a voltage applied thereto being decreased. Namely, if two or more light sources are used in the light source system of the present invention, a voltage applied to the light source can be reduced. Thereby, a useful life of the lamp 11 used in the light source system can be significantly longer than a life of the lamp used in the conventional light source system.

Figure 14:
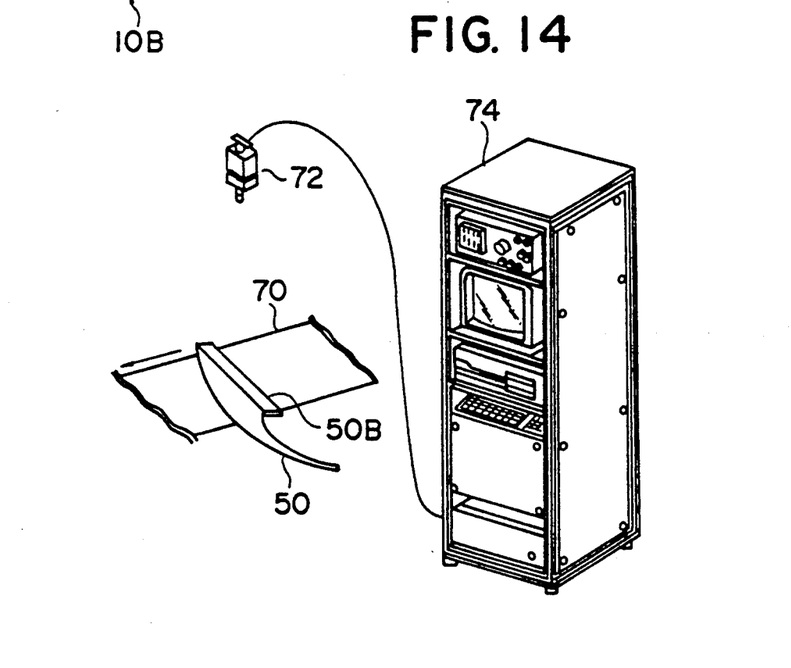
FIG. 14 is a diagram showing an inspection system using the light source system which includes the uniforming device of the present invention.

FIG. 14 is a diagram for illustrating how a light source system including the uniforming device of the present invention is applied to a linear light source in an inline inspection system. The lightguide 50 is composed of a three-decker optical fiber ("ESKA SK20" manufactured by Mitsubishi Rayon Kabushikikaisha) whose light emitting portion 50B has a diameter of 0.5 mm and a length of 350 mm. In an "incident end" portion (not shown), all of the optical fibers branch into two bundles thereof each having a circular section. Thus, two light sources each of which is constructed as shown in FIG. 1 are used in this embodiment. Further, an acrylic cylindrical body having a diameter 24 mm and a length of 150 mm is used as a first optical transmission portion 31 and a bundle of the optical fibers "ESKA SK20", which has a length of 1 m and a diameter of 24 mm, is used as a second optical transmission portion 61.

In the system of FIG. 14, the light emitted from the light emitting portion 50B of the lightguide 50 is irradiated on the surface of an object 70 of inspection such as a paper and the light reflected by the object 70 is detected by a CCD camera 72 which has a one-dimensional array of CCD elements. An output signal of the CCD camera 72 is sent out to a signal analyzer 74 whereupon the output signal is processed. The object 70 of inspection is adapted to move at a constant rate as indicated by an arrow and various defects included therein can be detected.

Figure 15:
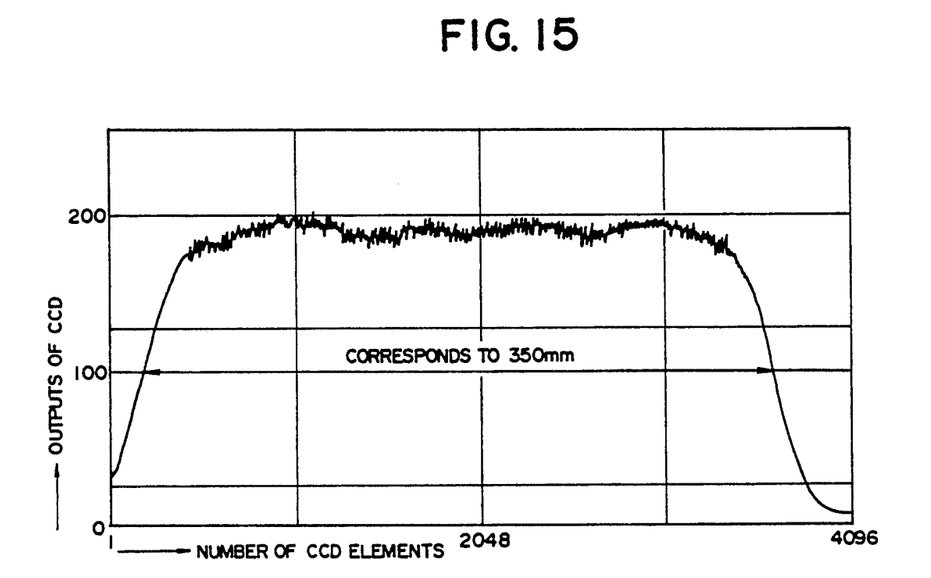
FIG. 15 is a graph showing variation in the quantity of the light emitted from a linear emitting portion included in the inspection system of FIG. 14.

FIG. 15 is a graph showing result of measurement of the variation in quantity of the light emitted from the "emitting end" portion 50B of the lightguide 50. To effect this measurement, an object of inspection having a region of uniform reflectivity such as a sheet of white paper is fixed in the system. Further, the light emitted from the lightguide 50 is emitted on the surface of the object of inspection and the reflected light from the object of inspection is received by the CCD camera 72. As a result of the measurement, a good value of the variation in the output of the CCD camera 72 in the whole inspected area, that is, ±5.3% is obtained.

While the preferred embodiments of the present invention have been described, it is to be understood modifications will be apparent to those skilled in the art without departing from the spirit of the invention. The scope of the present invention, therefore, is to be determined solely by the appended claims.

What is claimed is:

1. A light receiving device for receiving light from a light source and transferring the received light to an optical fiber type lightguide, said light receiving device having a first optical transmission means, of which an emitting end is connected to an incident end of an optical fiber type lightguide, for uniforming the distribution in emitting angle of the quantity of light emitted therefrom, said light receiving device further comprising:

a second optical transmission means which has an emitting end connected to an incident end of said first optical transmission means, a free incident end for receiving light from a light source and a plurality of optical fibers extending between said emitting and incident ends thereof arranged such that an incident end of each of the optical fibers is randomly positioned on the incident end thereof and an emitting end of each of the optical fibers is randomly positioned on the emitting end thereof.

2. A light receiving device as set forth in claim 1, wherein said first optical transmission means is a cylindrical or columnar light-transmitting device made of acrylic resin.

3. In an optical system having a light source system including a light source for emitting light and a uniforming device for receiving the light emitted from said light source and emitting light of which distribution in emitting angle of the quantity or intensity is uniformed, said optical system further having an optical fiber type lightguide for receiving light emitted from said uniforming device and transmitting the light to an external point, said uniforming system comprising:

a first optical transmission means connected to said lightguide for further uniforming the distribution of the quantity of light emitted from said lightguide; and a second optical transmission means connected to said first optical transmission means and having a plurality of optical fibers stretching across the inside thereof such that an incident end of each of optical fibers is randomly positioned on the incident end thereof and an emitting end of each of the optical fibers is randomly positioned on an emitting end thereof.

4. A light source system as set forth in claim 3 wherein a focal position of said light source is positioned on the incident end of said second optical transmission means and an angle formed by a segment drawn from the center of the focal position to said light source and a normal to the incident end of said second optical transmission means can be changed to appropriately uniform the distribution of the quantity or intensity of the light emitted from said first optical transmission means to said lightguide.

5. A light source system as set forth in claim 3 wherein one or more light sources are further rotatably provided in said light source system such that the focal position of each of said light sources is placed on the incident end of said second optical transmission means and that angles each formed by a segment drawn from the center of each of the focal position to said light source and a normal to said second optical transmission means can be changed to appropriately uniform the distribution of the quantity or intensity of the light emitted from said first optical transmission means to said lightguide.

6. A light source system as set forth in claim 3 wherein said first transmission means is a cylindrical or columnar light-transmitting device made of acrylic resin.

* * * * *